(12) United States Patent
Kalibjian

(10) Patent No.: US 7,254,288 B2
(45) Date of Patent: Aug. 7, 2007

(54) CORNER CUBE DEPOLARIZER

(76) Inventor: Ralph Kalibjian, 1051 Batavia Ave., Livermore, CA (US) 94550

(*) Notice: Subject to any disclaimer, the term of this patent is extended or adjusted under 35 U.S.C. 154(b) by 0 days.

(21) Appl. No.: 11/247,020

(22) Filed: Oct. 11, 2005

(65) Prior Publication Data

US 2007/0081757 A1    Apr. 12, 2007

(51) Int. Cl.
*G02B 6/34* (2006.01)
*G02B 5/04* (2006.01)
*G02B 27/28* (2006.01)

(52) U.S. Cl. .................. 385/11; 385/36; 359/488; 359/834

(58) Field of Classification Search .............. None
See application file for complete search history.

(56) References Cited

U.S. PATENT DOCUMENTS

| | | | |
|---|---|---|---|
| 4,966,431 A | 10/1990 | Heismann | |
| 5,212,743 A | 5/1993 | Heismann | |
| 5,568,309 A * | 10/1996 | Rockwell | 359/338 |
| 6,421,471 B2 | 7/2002 | Shen | |
| 6,498,869 B1 | 12/2002 | Yao | |
| 6,735,350 B1 | 5/2004 | Gauthier | |
| 6,819,810 B1 | 11/2004 | Li et al. | |
| 6,891,998 B2 | 5/2005 | Jones | |
| 2003/0007149 A1 | 1/2003 | Yamamoto | |
| 2003/0063833 A1 | 4/2003 | Gonthler et al. | |
| 2003/0112436 A1 | 6/2003 | Yao | |
| 2006/0001888 A1* | 1/2006 | Hill | 356/493 |

OTHER PUBLICATIONS

U.S. Appl. No. 10/763,529, filed Jan. 23, 2004, Kalibjian, Fig. 9(a).
Ralph Kalibjian, "Stokes polarization vector and Mueller matrix for a corner cube reflector", Optics Communications (journal), Oct. 2004, 39-68, vol. 204, Elsevier, Amsterdam.

* cited by examiner

*Primary Examiner*—Kevin Wood
*Assistant Examiner*—Jerry T Rahll

(57) ABSTRACT

The depolarizer utilizes a commonly available BK7 glass corner cube to transform linearly polarized light into depolarized light with 100% conversion efficiency. The low-cost corner cube is a unique optical element that greatly simplifies the means for producing completely depolarized light as compared to other current methods and techniques. The corner cube is irradiated uniformly, but at non-normal incidence for a tilt angle of about 9° with respect to the input light beam path. The polarization orientation angle of the input beam in combination with the tilt angle and tilt-axis orientation of the corner cube must be optimized in order to make the Stokes polarization parameters equal to zero, and thereby generating the depolarized light beam A bidirectional beam director steers the retro-reflected depolarized light beam from the corner cube to the output port of the depolarizer.

10 Claims, 10 Drawing Sheets

θ (TILT ORIENT.)

θ (TILT ORIENT.)

FIG. 13

(1) $\cos\theta = \frac{1}{2}\sqrt{3}\frac{(l-m)}{\sqrt{1-lm-nl-mn}}$,   $\cos\sigma = \frac{l+m+n}{\sqrt{3}}$ (2) $n = \frac{1}{\sqrt{3}}(\cos\sigma - \sqrt{2}\sin\theta\sin\sigma)$,   (3) $l = \frac{1}{2}(F \pm G\cos\theta)$,   $m = \frac{1}{2}(F \mp G\cos\theta)$ (4) $F = -(n-C)$,   $C = \sqrt{3}\cos\sigma$,   (5) $G = \sqrt{\frac{(3n+C)(n-C)+4}{3-\cos^2\theta}}$ (6) $\cos\alpha = \frac{l+m}{\sqrt{[2n^2+(l+m)^2](l^2+m^2)}}$,   (7) $\cos\gamma_x = \frac{m}{\sqrt{(l^2+m^2)(m^2+n^2)}}$ (8) $\cos\gamma_y = \frac{l}{\sqrt{(l^2+m^2)(l^2+n^2)}}$,   (9) $\cos\phi_{12} = \frac{mn}{\sqrt{(l^2+n^2)(l^2+m^2)}}$

(10) $\cos\phi_{13} = \frac{lm}{\sqrt{(l^2+n^2)(m^2+n^2)}}$,   (11) $\cos\phi_{23} = \frac{nl}{\sqrt{(l^2+m^2)(m^2+n^2)}}$

(12) $S'' = \frac{1}{6}[(_{-3}S' + {}_{-2}S' + {}_{-1}S') + ({}_{+3}S' + {}_{+2}S' + {}_{+1}S')]$

(13) $_{-3}S' = T_{2-}[\,M_3\,T_{2-}\,M_2\,T_{1+}\,M_1\,]\,_{+1}S$,   (14) $_{-2}S' = [\,M_2\,T_{1-}\,M_1\,T_{3+}\,M_3\,]\,_{+3}S$

(15) $_{-1}S' = T_{1+}[\,M_1\,T_{3-}\,M_3\,T_{2+}\,M_2\,]\,_{+2}S$,   (16) $_{+3}S' = T_{2+}[\,M_3\,T_{3-}\,M_1\,T_{1+}\,M_2\,]\,_{-2}S$

(17) $_{+2}S' = [\,M_2\,T_{2-}\,M_3\,T_{3+}\,M_1\,]\,_{-1}S$,   (18) $_{+1}S' = T_{1-}[\,M_1\,T_{1-}\,M_2\,T_{2+}\,M_3\,]\,_{-3}S$

(19) $M_q = \begin{vmatrix} 1 & 0 & 0 & 0 \\ 0 & 1 & 0 & 0 \\ 0 & 0 & \cos\rho_q & \sin\rho_q \\ 0 & 0 & -\sin\rho_q & \cos\rho_q \end{vmatrix}$,   (20) $\tan(\frac{1}{2}\rho_q) = -\frac{\cos i_q\sqrt{n_0^2\sin^2 i_q - 1}}{n_0\sin^2 i_q}$

(21) $i_1 = \arccos(m)$,   $i_2 = \arccos(n)$,   $i_3 = \arccos(l)$,   (22) $_{\pm q}S = \begin{vmatrix} 1 \\ \cos(2\Psi) \\ \pm\sin(2\Psi) \\ 0 \end{vmatrix}$

(23) $T_{q\pm} = \begin{vmatrix} 1 & 0 & 0 & 0 \\ 0 & \cos(2\Phi) & \mp\sin(2\Phi) & 0 \\ 0 & \pm\sin(2\Phi) & \cos(2\Phi) & 0 \\ 0 & 0 & 0 & 1 \end{vmatrix}$,   (24) $S'' = \begin{vmatrix} S_0'' \\ S_1'' \\ S_2'' \\ S_3'' \end{vmatrix} = \frac{1}{6}I\left[\begin{vmatrix} 1 \\ -S_1' \\ -S_2' \\ -S_3' \end{vmatrix}_{CW} + \begin{vmatrix} 1 \\ +S_1' \\ -+S_2' \\ +S_3' \end{vmatrix}_{CCW}\right]$

(25) $S'' = I\begin{vmatrix} 1 \\ 0 \\ 0 \\ 0 \end{vmatrix}$,   (26) $I(\beta,\varphi) = \frac{1}{2}I_0[1 + S_1'\cos(2\beta) + S_2'\cos\varphi\sin(2\beta) - S_3'\sin\varphi\sin(2\beta)]$

CORNER CUBE DEPOLARIZER

CROSS-REFERENCE TO RELATED APPLICATION

This application is related to U.S. patent application Ser. No. 10/763,529, filed Jan. 23, 2004.

BACKGROUND OF THE INVENTION

This invention is in the field of optics for implementing an optical depolarizer by means of a corner-cube.

Linearly polarized light launched into a fiber-optic invariably experiences birefringence as it propagates in the fiber. Birefringence effects transform linearly polarized light into elliptically polarized light that can compromise performance in signal processing, and in degrading performance in pumped optical amplifiers for long-haul communications systems. Depolarized light is not affected by birefringence, and thereby propagates without any polarization perturbations in the fiber. A depolarized light source is best described by the Stokes polarization parameters $S_1$, $S_2$, $S_3$ having zero values.

Depolarized light sources are useful in minimizing adverse polarization problems of fading in signal processing. Also in fiber-optic communication systems depolarizers have become useful in pumped optical amplifiers. Most optical amplifiers are polarization dependent in gain which means, a polarized pump source enhances gain in signals having the same polarization state. Since the polarization state of the signal cannot be effectively controlled, non-uniform signal gain occurs due to the inherent time-varying changes in the polarization state of the beam in the fiber. For this reason a depolarized pump source is used for the amplifier because it provides uniform gain characteristics. Considerations have also been given in using a depolarized light source for the signal at the transmitter in communication systems thus eliminating signal polarization issues in the amplifier as well.

Many different types of depolarizers have been described in the literature with the aim in generating a sufficiently large number of polarization states in the output beam such that the sum of each Stokes polarization parameter cancels out to zero (except for $S_0=1$). Depolarization can be performed by different methods as in 1) the electro-optic scrambler, 2) spatial averaging of a beam emerging from a retardation plate having phase gradient characteristics, 3) spatial averaging in quartz plate of the Lyot type, 4) re-circulation loop averaging by splitting and recombining light beams, and 6) spatial averaging of the retro-reflected beam from a high refractive index corner cube. Developments in various types of depolarizers will be reviewed and cited.

The polarization transformer as described in U.S. Pat. Nos. 4,966,431 and 5,212,743 (Heismann, dated Oct. 30, 1990 and May 18, 1993, respectively) can be used as a scrambler, also called a pseudo-depolarizer. The device consists of an electrically-controlled integrated-optic waveguide structure in a $LiNbO_3$ substrate. The scrambler speed has to be fast enough such that the scrambled polarization states are blurred together into a time-averaged depolarization state without showing adverse polarization effects. Other types of depolarization systems have also been described. For example, depolarization can be achieved in a birefringent medium by re-circulating a split-off portion of the output light back into the input of the birefringent medium as described in U.S. Pat. No. 6,421,471 (Shen, Jul. 10, 2002). The output Stokes polarization parameters of the light beam averages to zero for a linear series of re-circulating loops, wherein the number of loops in the chain enhances the depolarization factor. The averaging scheme is entirely passive without the need for electronic drivers. Fiber loops in combination with a beam splitter/combiner can also be used for depolarizers as described in U.S. Patent Application No. 2003/0063833 (Gonthier, et al., Apr. 3, 2003) and in U.S. Pat. No. 6,735,350 B1 (Gauthier, May 11, 2004). A passive integrated-optics version of the loop type depolarizer is described in U.S. Pat. No. 6,891,998 (Jones, May 10, 2005) wherein a waveguide structure on a planar substrate with ancillary microresonators simulates re-circulating loops that couple evanescently light between the waveguide and the microresonators. Polarization states of the recirculated light from a microresonator are added randomly to the main beam in the waveguide; thus, with a sufficient number of resonators the output light tends to a depolarized state. Another method described in U.S. Patent Application No. 2003/0007149 (Yamamoto, Jan. 9, 2003) uses a series of birefringent plate-pairs that are bonded together such that the optical axis of each pair section is orthogonal to each other. The junction along the optical axis between the pair section is angled geometrically at 45° in order to enhance the mixing or averaging of the polarization states. The depolarization efficiency can be enhanced by inserting additional plate-pairs in the beam path; however, this occurs with a loss in beam intensity. Another application of a birefringent plate pair is described in U.S. Pat. No. 6,498,869 (Yao, Dec. 24, 2002) and U.S. Patent Application No. 2003/0112436 (Yao, Jun. 19, 2003), however, unlike Yamamoto's 45° angle junction between the plate-pairs, Yao uses a shallower angle between the plate-pair such that the phase gradient across the beam diameter is 360°. This allows the polarization states of the beam through the plate-pair to be mapped out spatially in a linear pattern symmetrically about the center-line of the beam. The beam is launched into a fiber which spatially averages the Stokes polarization parameters into a null thus resulting in a depolarized beam with only one birefringent plate-pair. Another depolarizer system has been described in U.S. Pat. No. 6,819,810 (Li, et al., Nov. 16, 2004) that utilizes 6 optical elements consisting of birefringence slabs, combiners, a Faraday rotor, and a mirror to retro-reflect a depolarized output beam from the optical ensemble for an initial irradiating polarized beam into the optical chain. It will be shown in the present invention that a far simpler method for generating depolarized light beam from a retro-reflected light beam is with a single optical element, namely, a corner cube.

A recent entry into the depolarizer category has been a corner cube as described in U.S. patent application Ser. No. 10/763,529 (Kalibjian, Jan. 23, 2004) and also in a technical journal article (R. Kalibjian, Optics Communications Vol. 240, October 2004, pp. 39-68). The corner cube depolarizer is based upon spatial averaging of the six polarization states of the retro-reflected beam from the output hexads of the corner cube. In this case a circularly polarized input light beam is normally incident to a high-refractive index corner cube (uniquely at $n_0=1.76748$ for 633-nm wavelength). The retro-reflected light from the corner cube is launched into a fiber which spatially averages the beam into completely depolarized light at the fiber output. In the above cited patents the output beam from the various depolarizers are temporally-incoherent; however, an exception is the corner cube depolarizer which has a phase-equalized beam-director resulting in a temporally-coherent depolarized beam. The corner cube depolarizer as compared to other types has the advantage of being deployed over the entire spectral range of the glass and having negligible degree of polarization in a 100-nm bandwidth.

In summary, current depolarization methods for narrow bandwidth lasers require scrambling the polarization states either by active means in an integrated-optic waveguide or by passive means in re-circulating fiber loops or in birefringent plate pairs. Ideally, the aim in depolarization for these devices is to create a sufficient number of polarization states such that the sum of each Stokes polarization parameter cancels out to zero. On the other hand, the corner cube depolarizer is based upon an entirely different concept because of the cube's unique polarization properties. It has the advantage of having a very small degree of polarization as compared to the other types of depolarizers. The corner cube depolarizer is noteworthy in reducing the complexity in packaging by utilizing only a single small-sized corner cube as compared to the packaging of multiple loops of fiber or birefrigent plate-pairs of the previously described depolarizers. The high-refractive glass corner cube can be obtained only on special order at a high procurement cost, whereas low-refractive-index BK7 glass corner cubes are commonly available at relatively low-cost. For this reason the present depolarizer invention has been developed in order to utilize a BK7 glass corner cube which is deployed in a slightly different manner than the high-refractive-index corner cube. The present invention can utilize glass corner cubes of arbitrary refractive index irradiated by a linearly polarized light beam as contrasted to the requirement for a circularly polarized light beam for the high-refractive glass corner cube.

BRIEF SUMMARY OF THE INVENTION

The object of my invention is to utilize a commercially available corner cube (less than $100) to transform linearly polarized light into depolarized light with 100% conversion efficiency. The present corner cube depolarizer invention has a broader application than the high refractive index depolarizer (U.S. patent application Ser. No. 10/763,529, Kalibjian, Jan. 23, 2004) because 1) the corner cube can be manufactured from any type of glass and is not restricted to the unique high-refractive glass, and 2) the linearly polarized input light requirement minimizes the number of optical elements in the depolarizer module by elimnating the quarter-waveplate required for producing the circularly polarized input light in the prior invention.

The present invention describes the manner in which a commonly available BK7 glass ($n0=1.515$ at 633-nm) corner cube can be utilized as a depolarizer when the major diagonal of the corner cube is tilted with respect to the input beam path. The operation of the depolarizer is based upon the total-internal-reflection properties in the BK7 glass corner cube. Linearly polarized collimated light at a non-normal incidence angle $\alpha$ with respect to the major diagonal of the corner cube irradiates uniformly all three facets of the cube. The resulting polarized retro-reflected output beam from the BK7 corner cube when launched into a single-mode optical fiber located at a distance greater than the coherence length of the laseris spatially averaged into a completely depolarized light. The BK7 glass is not unique for the corner cube depolarizer because any other type of glass of arbitrary refractive index can be used as well.

Further objects and advantages of the depolarizer will become apparent from a consideration of the drawings and ensuing description.

BRIEF DESCRIPTION OF THE DRAWINGS

FIG. 2(a) shows an isometric view of the plane that is normal to the major diagonal of the corner cube whereas

FIG. 11(a) shows the tilted corner cube in a free-space coupling mode, whereas

FIG. 13 shows the equations used in the Detailed Description section wherein the equations in this section are captioned Eq. (N) where N is the equation number.

DETAILED DESCRIPTION OF THE INVENTION

Figure 1:
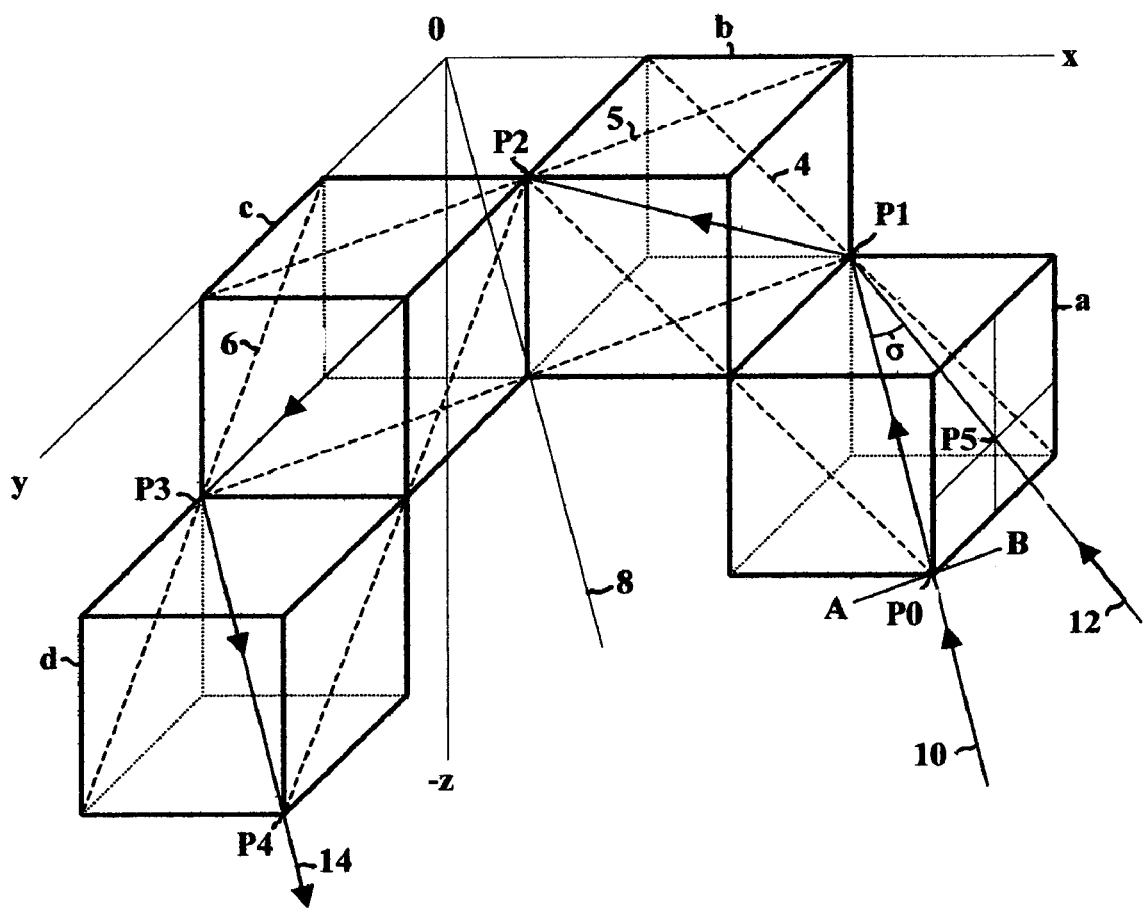
FIG. 1 shows an isometric view of the corner cube geometry.

The detailed description consists of three parts 1) the theoretical model for the corner cube depolarizer including the computational results from the theory, 2) experiments confirming the theroy and the conditions in achieving complete depolazization of the input light beam, and 3) the configurations for the various embodiments of the passive corner cube depolarizer.

Part I: Theory (Equations are Given in FIG. 13.)

A corner cube can be fabricated in two different configurations 1) a solid corner cube fabricated from a transmissive insulator of arbitrary refractive index, or 2) a hollow corner cube fabricated from three thin sheets (from the same insulator) assembled and bonded together to form a hollow cube. The facets of a corner cube comprise three mutually perpendicular planes. The reflected output light beam path (after being reflected sequentially from the trihedral planes of the cube) is always parallel to the input beam path. It is useful to illustrate the corner cube (either solid or hollow) comprised of sub-cubes as shown in the isometric drawing of FIG. 1. A normally incident input ray 10 with direction cosines $-l=-m=n=1/\sqrt{3}$ (referenced to the x, y, z axis, respectively) enters sub-cube a at point P0 and traverses the beam path P0→P1→P2→P3→P4 along the major diagonals of sub-cubes a, b, c, d. Reflection points of the ray at the trihedral facets (xz, xy, yz planes) of the corner cube are designated, respectively, by P1, P2, P3 and the planes of incidence 4, 5, 6 are the diagonal planes of the sub-cubes. It should be emphasized that ray 10 is only one beamlet of a collimated beam normally incident to the entire window of the corner cube. Now consider a second ray 12 (which comprises one ray of a non-normal incident collimated-beam) entering the sub-cube a at point P5 directed towards the reflection point P1 at an angle σ with respect to the major diagonal of sub-cube a. The beam path of the non-normal input ray 12 is dependant upon its initial direction cosines l, m, n as it reflects from facet to facet and the output beam exits the corner cube parallel to the input ray 12.

Figure 2A:
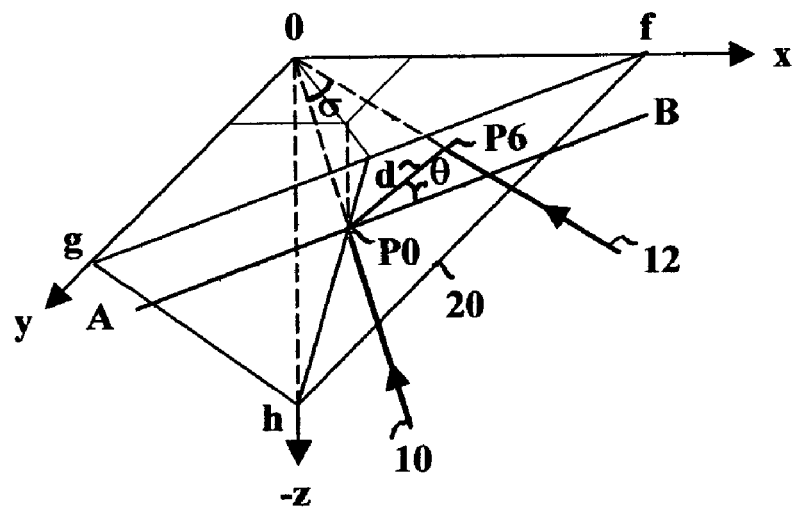

The trihedral planes of sub-cube a are re-drawn in a different perspective in FIG. 2(*a*) in order to illustrate clearly the normal plane 20 (bounded by fgh, f=g=−h=3) to the major diagonal 10 of sub-cube a. On the normal plane 20 with respect to the initialized xyz Cartesian coordinate system for sub-cube a the penetration point P0 for the major diagonal 10 is (1, 1, −1) whereas the penetration point P6 for the tilted input ray 12 is [3l/(l+m−n), 3m/(l+m−n), −3n/(l+m−n)]. The direction cosines can be represented on the normal plane 20 by mapping two parameters: 1) the distance d=√3 tan σ between the penetration points of the major diagonal 10 and the tilted ray 12, and 2) the tilt orientation angle θ (or the complementary tilt axis at θ+90°). The tilt orientation angle θ is measured with respect to the horizontal A-B line of FIG. 1 as re-drawn on the normal plane 20 of FIG. 2(*a*). The horizontal line is parallel to the xy-plane (and also perpendicular to the major diagonal 10) having direction cosines $l_h=1/\sqrt{2}$, $m_h=-1/\sqrt{2}$, $n_h=0$. A plane normal to the major diagonal 8 of the corner cube in FIG. 1 is the viewing plane for determining experimentally the tilt angle σ from front-surface reflection measurements at a given tilt orientation angle θ with respective ranges of −90°<σ<90° and 0°<θ<360°. The projected view of the corner cube on the plane normal to the major diagonal 8 is shown in FIG. 2(*b*), whereby the projected angles of the x, y axes with respect to the A-B line are 30° for a vertically-oriented z-axis. The tilt angle σ is the internal angle to the cube whereas from Snell's law the external angle is σ'=arcsin ($n_0$ sin σ).

The expressions for θ and σ are given in FIG. 13 by Eq. (1) where $l^2+m^2+n^2=1$ is the normalization condition for the direction cosines. For a collimated input beam the direction cosines l, m, n are invariant over the entire entrance window of the corner cube. The expressions in Eq. (1) are not relegated only to the given point in sub-cube a in FIG. 1; they apply equally as well to every point in the plane normal to the major diagonal 8 of the corner cube in FIG. 1 because of translational and rotational symmetries. For this reason the projected normal plane of FIG. 2(*b*) is centered to the major diagonal 8 of the corner cube and all the symbols of FIG. 2(*a*) can be maintained the same in the translated plane. The sign convention for the tilt angle is positive in FIG. 2(*a*). As viewed from the normal plane, for example, at an orientation angle θ=60° in FIG. 2(*b*) a positive (negative) tilted input ray means that point P6 rotates about the 150°-330° tilt-axis such that point P6 rotates out of the paper towards (away from) the reader. It is also useful to remember that a positive tilt at the orientation angle $θ_0$ is equivalent to a negative tilt at θ=$θ_0$+180°.

The direction cosines l, m, n (as determined from (1) for a given tilt and orientation) are given by Eqs. (2)-(5). Equation (1) provides the relationships for mapping the direction cosines of the tilted corner cube directly onto the plane normal to the major diagonal of the cube in terms of the tilt angle σ and the tilt orientation angle θ; whereas, Eqs. (2)-(5) provide a means for determining the direction cosines from the measured angles of tilt and orientation.

It is also useful to project the corner cube on the plane normal to the tilted beam as shown in the diagram of FIG. 3(*a*) which is drawn for σ=7.0° and θ=60° (l=0.5730, m=0.4869, n=0.6592 from Eqs. (2)-(5)). In FIG. 3(*a*) the boundary lines of the triad sectors 1, 2, 3 (corresponding to the facets of the corner cube) are designated by the projected Cartesian coordinate axes x, y, −z. The normal field vector to the plane of incidence in sector 2 designated by $E_{S2}$ is taken as the horizontal reference line A'-B' which is parallel to the x-y plane. The angle α between the corresponding $E_{S2}$ vectors (lines A'-B' of FIG. 3(*a*) and A-B of FIG. 2(*b*)) of the tilted and the untilted normal planes is given by Eq. 6 where α=3.04° for σ=7.0°. The angle between the horizontal reference line A'-B' and the projected x, y coordinates in FIG. 3(*a*) is given by Eqs. 7 and 8 where $γ_x$=37.80° and $γ_y$=29.25°, and for the z-coordinate $γ_z$=90°. The polarization orientation angle ψ having a range 0°<ψ<180° is also referenced to the horizontal $E_{S2}$ axis as shown in FIG. 3(*a*).

The electric field vector of the initial input light beam to each triad sector is resolved into $E_S$, $E_P$ components that are perpendicular and parallel to the plane of incidence, respectively, are shown in FIG. 3(*b*). The $E_P$ axis partitions the triad sector into two hexad regions by the CCW (counter-clockwise) and CW (clockwise) modes that correspond to a left-hand and a right-hand Cartesian co-ordinate system, respectively. For example, with a probe beam incident at any point within the hexad region between lines $E_{P1}$ and x in sector 1, the beam would propagate in the CCW direction; whereas, for a probe beam shifted to any other position in the adjoining region between lines $E_{P1}$, and −z the beam would propagate in the CW direction. The CW (CCW) mode has three hexad regions with corresponding radial axes $E_{S1−}$, $E_{S2−}$, $E_{S3−}$, ($E_{S1+}$, $E_{S2+}$, $E_{S3+}$). The subscript number on $E_S$, $E_P$ has the correspondence to the triad sector number, whereas the minus and plus correspond to the CW and CCW modes, respectively. The polarization analysis can be carried out for a single mode only. The two modes can then be separated out later by simply assigning opposite signs to the output polarization orientation angle ψ. The angles $φ_{12}$, $φ_{13}$, $φ_{23}$ between the $E_S$ axes shown in FIG. 3(*b*) are given by Eqs. (9)-(11).

The output beam of the CW/CCW modes consists of six different polarization states from the output hexad regions of the corner cube that are combined together and focused into a single mode fiber or into a detector. The output Stokes vector S" from the six superpositioned sources is given by Eq. (12) where 6 is a normalization constant, and each source is subscripted for a given hexad region in FIG. 3(*b*) with the plus sign for the CCW mode and the negative sign for the CW mode. The outputs from the hexad region sources are given by the matrix equations (13)-(18). The bracketed matrix product in Eqs. (13)-(18) corresponds to the sequential propagation of the ray in the three facets of the corner cube where M is the Mueller reflection matrix, and T is the matrix that transforms the coordinates between facets. The unprimed S matrix is the input Stokes vector, and the T factor multiplying the bracket in Eqs. (13), (15), (16), (18) specifies the location of the output hexad region in the diagram of FIG. 3(*b*). Each subscript number on M, S, T corresponds to the same numbered hexad region in FIG. 3(*b*) with the plus sign for the CCW mode and the negative sign for the CW mode.

The Mueller reflection matrix for the facet is given by Eq. (19) where the subscript q denotes the triad sector number in FIG. 3, and the matrix element is given by Eq. (20) where $i_q$ is the angle of incidence of the collimated input beam to the $q^{th}$ facet in terms of the direction cosines of the propagating ray in Eq. (21).

Figure 3A:
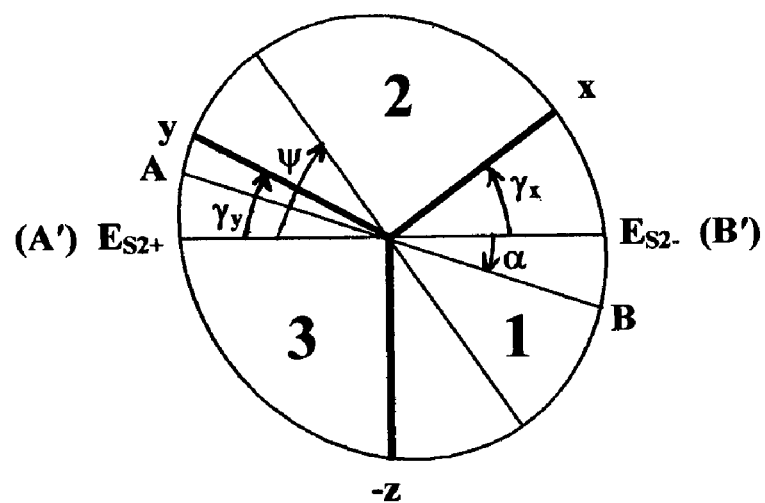
FIGS. 3(a)-(b) show the projected planes normal to the tilted input ray to the corner cube.
Figure 3B:
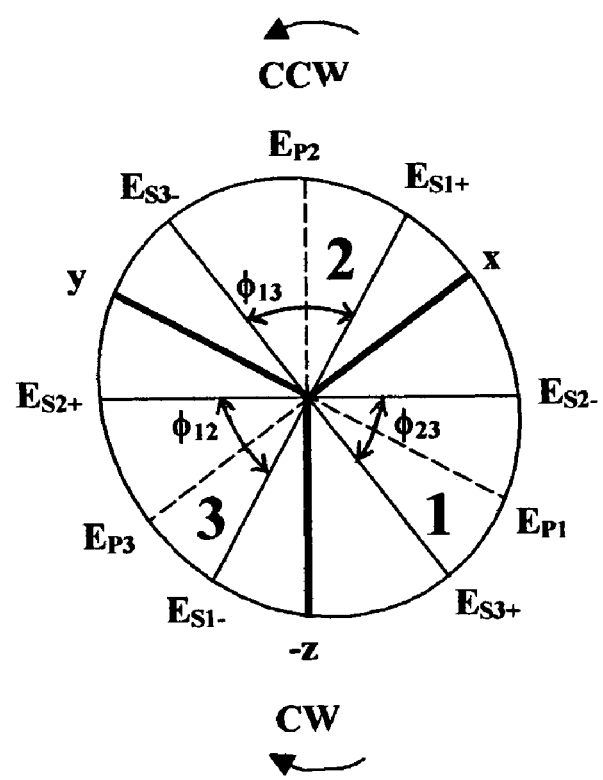

A collimated linearly-polarized input beam irradiating uniformly all facets of the tilted corner cube in FIG. 3(a) is represented by the column matrix given in Eq. (22) where q=1, 2, 3, and $\Psi=(\psi+\phi_{13})$ for $_{\pm 1}S$, $\Psi=\psi$ for $_{\pm 2}S$, $\Psi=(\psi-\phi_{23})$ for $_{\pm 3}S$; also, the polarization orientation angle $\psi$ of the input beam is measured with respect to its corresponding $E_{S2}$ axis as shown in FIG. 3(a), and $\phi_{12}$, $\phi_{13}$ and $\phi_{23}$ are the angles between the $E_{S1}$-$E_{S2}$, $E_{S1}$-$E_{S3}$, and $E_{S2}$-$E_{S3}$ vectors, respectively, as shown in FIG. 3(b). The transformation matrices are rotational matrices in the intensity domain as given by Eq. (23) where the matrix element is formally equivalent to the rotation angle $\Phi$ between succeeding $E_S$ vectors in adjacent triad sectors, therefore $\Phi=\phi_{12}$ for $T_{1\pm}$, $\Phi=\phi_{23}$ for $T_{2\pm}$, $\Phi=\phi_{13}$ for $T_{3\pm}$.

From Eq. (12) the Stokes polarization vector is separated into a CW column matrix and a CCW column matrix as given in Eq. (24) where I is the beam intensity, and the negative sign in the $_+S_2'$ parameter is required in order to separate out the CCW/CW modes into a left-hand and right hand-Cartesian coordinate system. Each parameter in the CW and CCW column matrices is the sum of three polarization parameters from Eqs. (13)-(15) and Eqs. (16)-(18), respectively; for example, $_-S_1'=_{-3}S_1'+_{-2}S_1'+_{-1}S_1'$ where the components from the second row from each of the column matrices of Eqs. (13)-(15) correspond to the CW hexad regions in the 1, 2, 3 triad sectors. The direction cosines lmn for a given a tilt angle $\sigma$ and orientation angle $\theta$ provide the input data to Eqs. (13)-(18). Computation runs have been made to determine the polarization states in Eq. (24) for the allowed direction cosines from Eqs. (2)-(5).

Figure 4:
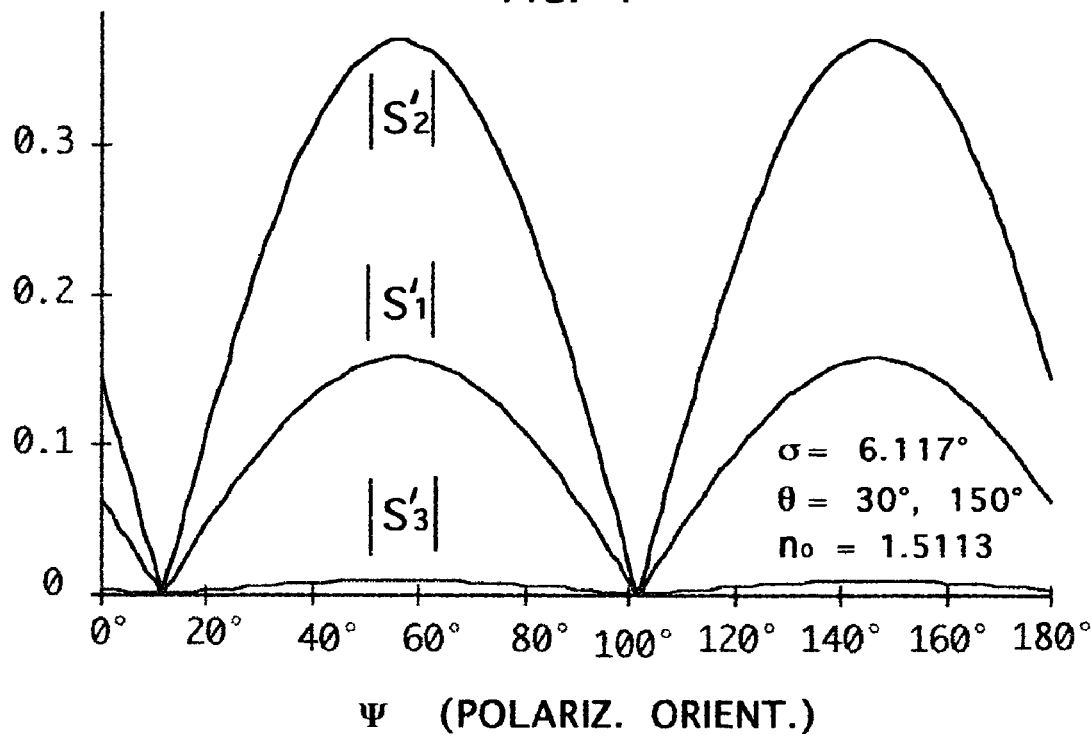
FIG. 4 shows the depolarization state triple null-point plots for the Stokes polarization parameters for the optimally tilted corner cube.
Figure 6A:
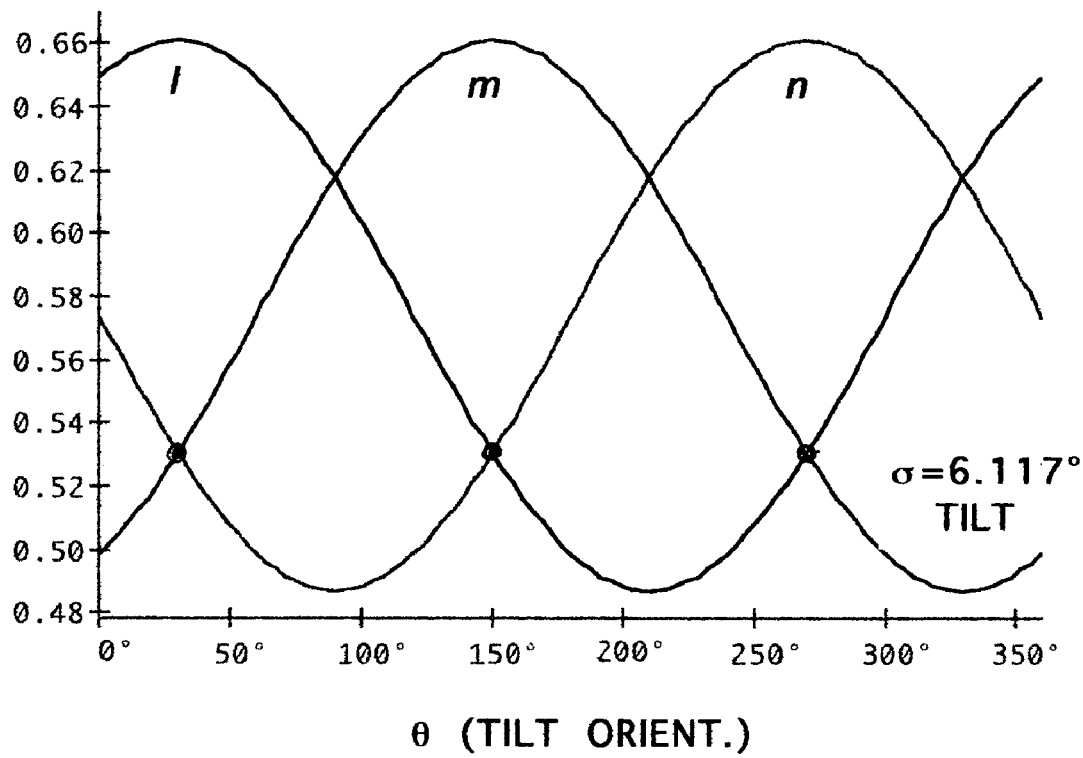
FIGS. 6(a)-(b) show the direction cosines for the input ray to the tilted corner cube.
Figure 6B:
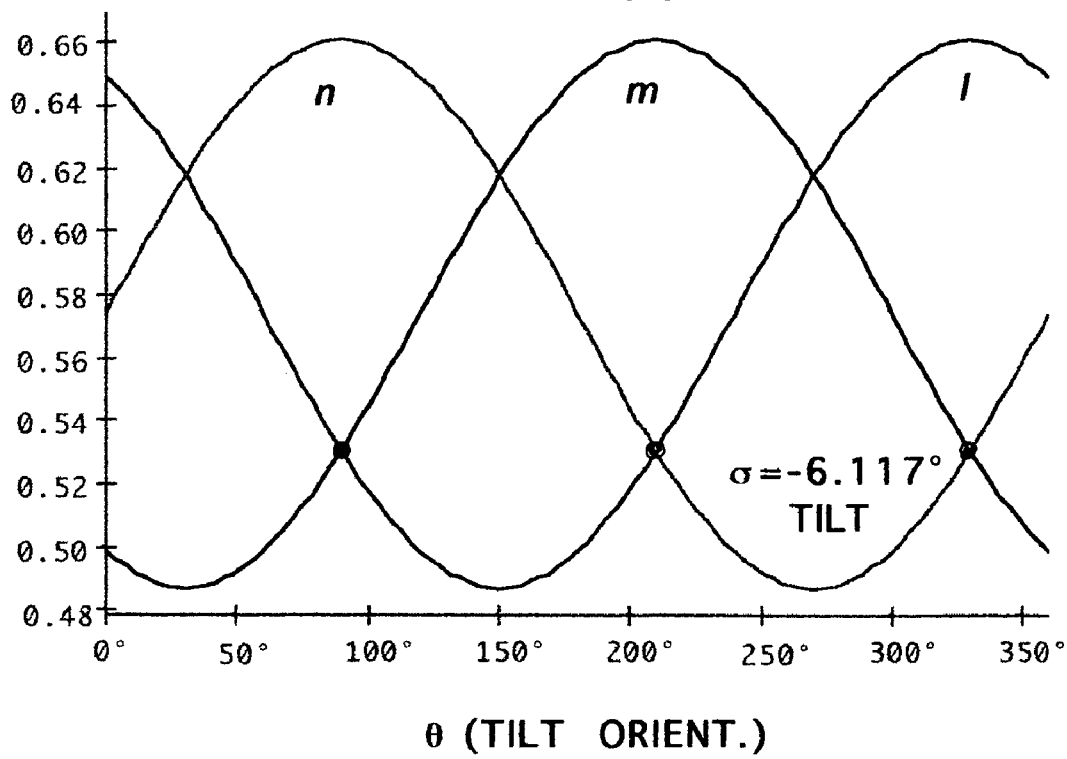

The initial computation runs searched for the depolarization state for the BK7 glass corner cube having a refractive index $n_0$=1.5113 (measured at the 633-nm wavelength for the test corner cube). Depolarization requires a triple null-point for the Stokes vector in Eq. (24) wherein $S_1''=_-S_1'+_+S_1'=0$, $S_2''=_-S_2'-_+S_2'=0$, $S_3''=_-S_3'+_+S_3'=0$; thus, all polarization parameters are zero except for $S_0''=1$. The depolarization state condition can be obtained by appropriate tilting of the corner cube. FIG. 4 shows an example of a computation plot for $|S_1''|$, $|S_2''|$, and $|S_3''|$ vs. the polarization orientation angle $\psi$. The curves have translational symmetry for polarization angles shifted by 90°. A triple null-point depolarization occurs at $\psi_0$=11.6° (and 101.6°) for a tilt angle $\sigma$=6.1165° at the orientation angle $\theta$=30° which corresponds to the x-line in FIG. 2(b). Additional computation runs confirm triple null-points for $\theta$=150° and 270° for the $\sigma$=6.117° tilt angle. For negative tilt $\sigma$=−6.117° the triple null points occur at $\theta$=90°, 210°, and 330° in FIG. 2(b). With reference to the untilted normal plane in FIG. 2(b), the analysis shows that a completely depolarized beam occurs in only three allowable tilt orientation directions 30°-210°, 150°-330°, 270°-90° for plus or minus tilt. The depolarization state of the overall Stokes vector is the sum of the six polarization states of the hexad regions in Eq. (12). The output from each hexad region is elliptically polarized; however, the sum of all the hexad regions corresponding to each row of the column matrix in Eq. (24) is zero (except for the first row), thus the output Stokes vector becomes completely depolarized as given by Eq. (25). The lmn direction cosines as plotted from Eqs. (2)-(3) for $\sigma=\pm 6.117°$ are shown in FIGS. 6(a)-(b) where the complete depolarization states are indicated by • in the figures. The curves in FIG. 6 have been drawn for the upper sign in Eq. (3), whereas with the lower sign the l and m curves interchange. Solutions are also valid for a positive sign in the second term of Eq. (2) which reverses the tilt-sense $\sigma$.

Figure 5:
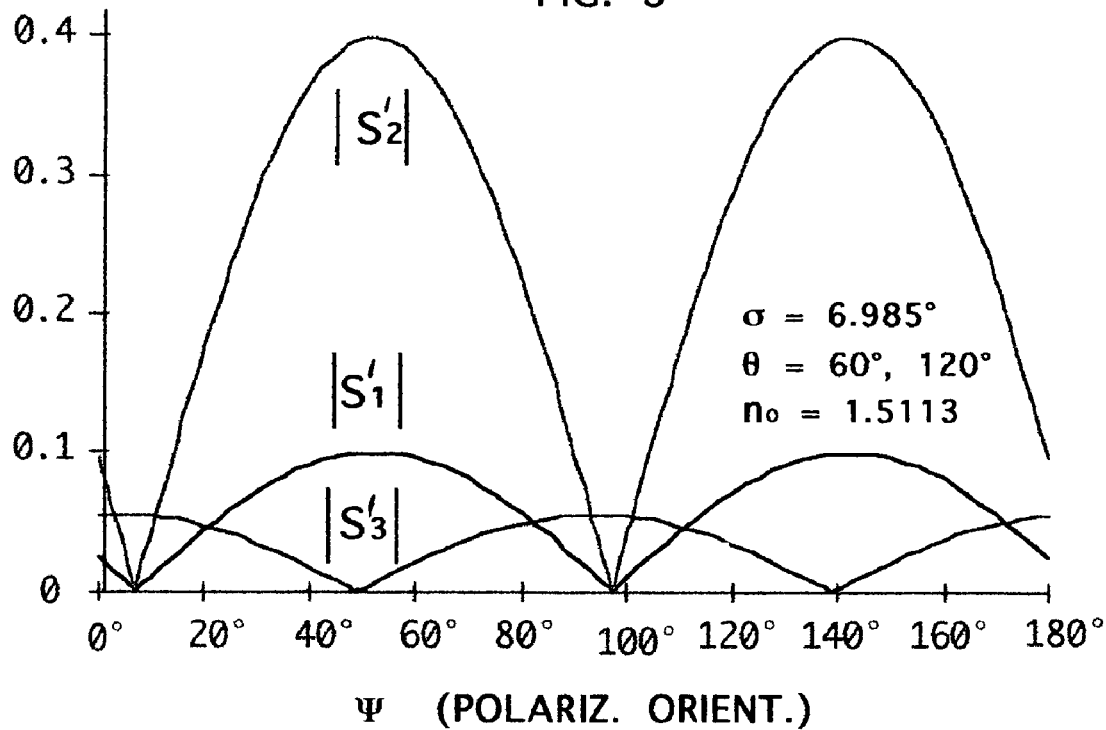
FIG. 5 shows the double null-point plots for the Stokes polarization parameters for the optimally tilted corner cube.
Figure 7:
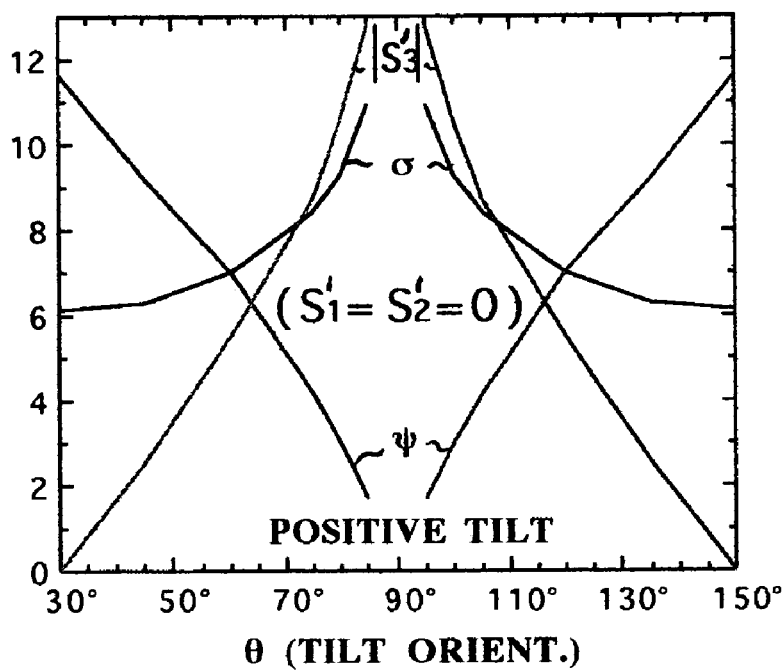
FIG. 7 shows the depolarization state properties for a positive tilted corner cube at $\theta=30°$ and $\theta=150°$.
Figure 8:
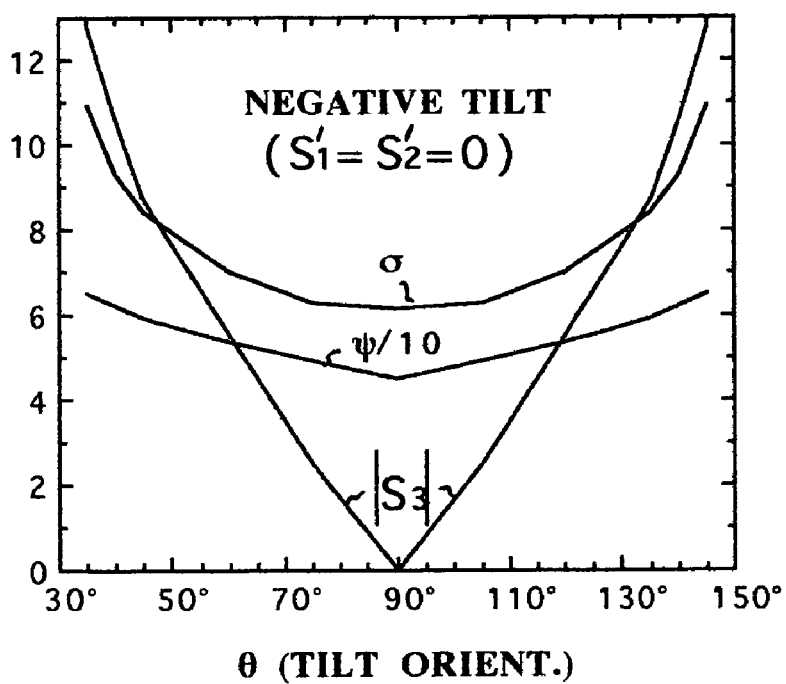
FIG. 8 shows the depolarization state properties for a negative tilted corner cube at $\theta=90°$.
Figure 9:
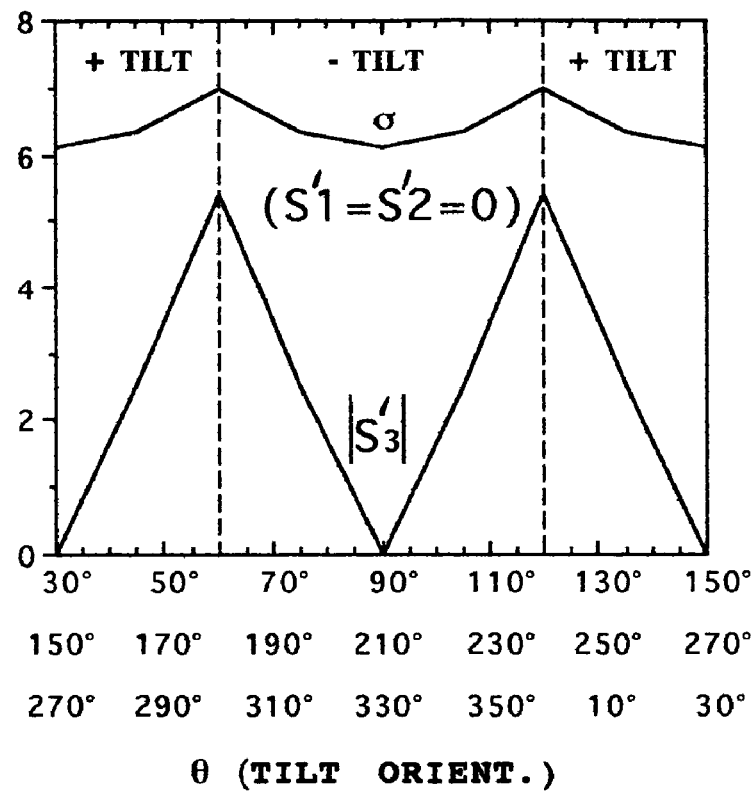
FIG. 9 shows a composite curve drawn from FIGS. 7 and 8.

The tilted corner cube also has double null-point properties characterized by $S_1''=S_2''=0$ with finite $S_3''$. This is shown in the example of FIG. 5 for a computation plot at $\theta$=60° for $\sigma$=6.985° resulting in $S_3''$=5.4% at the double null-point of $\psi$=8.1° (and 98.1°). The orientation angle at $\theta$=60° is unique because it gives the same $S_3''$ values for either plus or minus tilt ($\sigma=\pm 6.985°$); whereas, at a given angle $\theta$ both $S_3''$ and $\sigma$ have different values for plus or minus tilt as shown in FIGS. 7 and 8. The double null-point property is not continuous in the triad sector as can be surmised in FIGS. 7 and 8 for triad sector 2. Double null-point condition is not allowed in a 10° range in the middle of the triad sector for the positive tilt case in FIG. 7, nor allowed in a 5° range at both ends of the triad sector for the negative tilt case in FIG. 8. For the positive tilt in the corner cube (as shown in FIG. 7) a circularly polarized output component in the range of $0<S_3''<13\%$ corresponds to a tilt range of $6.12°<\sigma<10.9°$ that occurs in a split orientation range of $30°<\theta<85°$ and $95°<\theta<150°$. For the negative tilt case the double null-point range is $35°<\theta<145°$ as shown in FIG. 8. The curve sets of FIGS. 7 and 8 are symmetrically disposed in each triad sector of the corner cube, however the polarization orientation angle $\psi$ will be different depending upon the location of the triad sector. FIG. 9 shows a composite curve that is composed of 1) the two angular sections of $\theta$=30° to 60° and 120° to 150° from FIG. 7 corresponding to positive tilt, and 2) the angular section of $\theta$=60° to 120° from FIG. 8 corresponding to negative tilt. From FIG. 9 there are three depolarization triple null-points in triad sector 2 of FIG. 2(b) corresponding to the orientation angles $\theta$=30°, 150° for positive tilt and 90° for negative tilt at $|\sigma|$=6.117°; also, the double null-points (between the depolarization points) are continuous with a tilt angle $\sigma$ ranging between 6.117° to 6.985° having a circular polarization component $S_3''$ ranging between zero and 5.4%. FIG. 9 is also applicable to triad sectors 1 and 3 because of 3-fold rotational symmetry in the normal plane of FIG. 2(b), or alternatively in recognizing that a positive tilt at $\theta$=30° (150°) represents a negative tilt at $\theta$=210° (330°); hence, the tilt orientation scale has been inscribed in FIG. 9 for the additional two triad sectors. Thus, the three orientation angle pairs 30°-210°, 90°-270°, 150°-330° are the edge-line directions of the adjoining facets for triple-point depolarization at the 6.117° tilt angle.

An important consideration in the application of a depolarizer is the DOP (degree of polarization) dependence on wavelength. The corner cube has a very small dependence on wavelength. This can be examined by making computation plots of the Stokes polarization parameters similar to FIGS. 4 and 5 for the following wavelengths 1550-nm, 1310-nm, 1060-nm, 633-nm; the corresponding refractive indices to these wavelengths for the BK7 glass from the manufacturer's data sheet are $n_0$=1.500, 1.504, 1.507, 1.515, respectively. Note the refractive index enters into the computation only through Eq. (20). At 1550-nm the tilt angle is initially adjusted for the triple null-point depolarization state at $\sigma$=5.90°. Thereafter the tilt angle is held constant for the computation plots for the remaining wavelengths of 1310-nm, 1060-nm, and 633-nm. The tilt orientation angle $\theta$ for depolarization is maintained constant in the direction of the edge-line between adjacent facets. From the computation plots the DOP for the 1550-nm, 1310-nm, 1060-nm, 633-nm wavelengths are 0%, 0.26%, 0.66%, 1.28%, respectively, all occurring at a constant polarization orientation angle $\psi_0$=11.6°. Practically, the DOP is less than 0.1% for 100-nm bandwidth in the BK7 spectral window because the refractive index of the BK7 glass changes very slowly with wavelength.

Part II: Experiments

Figure 10:
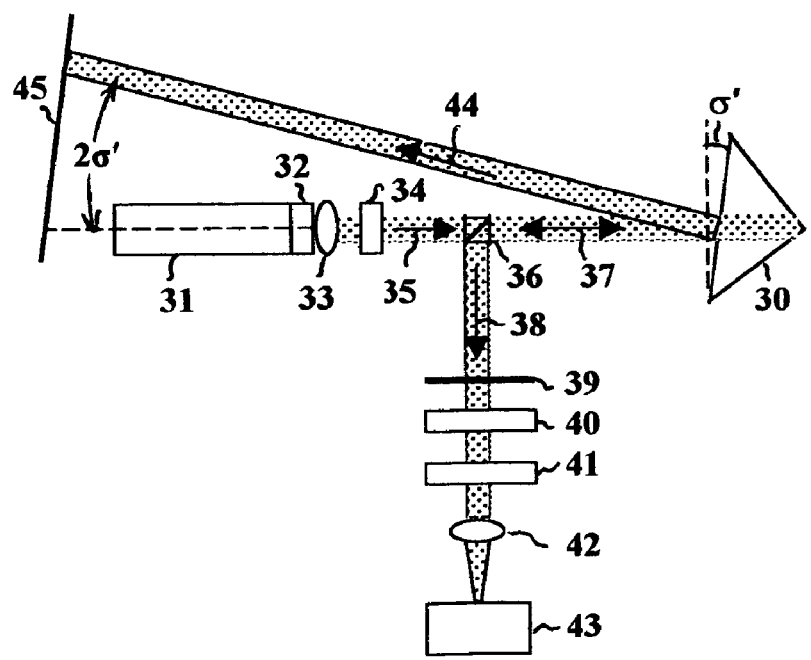
FIG. 10 shows the experimental set-up for measuring the optimized tilt conditions of the corner cube in generating the depolarized light beam.

A reality check is required to verify theory with experiment. Experiments have been performed with a 1-in. diameter uncoated BK7 corner cube 30 as shown in FIG. 10. A linearly polarized laser 31 provides by means of an expander/collimator lens 33 an 8-mm diameter collimated light beam 35 that is incident symmetrically to the vertex of the tilted corner cube 30. A HWP (half-wave-plate) polarization rotator 34 and a NPBS (non-polarizing beam splitter) 36 are interposed between the laser 31 and the corner cube 30. The beam 35 transmits through the NPBS 36 and reflects back a beam 37 from the corner cube 30 and into the output port of the NPBS 36. The pass-through component of the retro-reflected beam through the NPBS 36 is blocked from feeding back into the laser 31 by the isolator 32. The reflected output beam 38 (a wagon-wheel pattern) from the output port of the NPBS 36 is viewed on a translucent screen 39 in order to properly align and center the corner cube 30 to the pattern of FIG. 2(b) by rotating the corner cube 30. After alignment the screen 38 is removed from the optical chain. Lens 42 focuses the output beam 38 (comprised of the six-segmented elliptically polarized beamlets of the corner cube 30) into the active area of the detector 43 wherein the beamlets become spatially averaged in the detector 43. Thereafter, the polarization state of the output beam 38 is evaluated with a QWP (quarter-waveplate) 40 in combination with an analyzer 41.

At the detector 43 the output beam intensity in FIG. 10 is given by Stokes Eq. (26) where $\phi$ is the phase shift of the QWP 40 and $\beta$ is the angle of the transmission axis of the analyzer 41. A completely depolarized light beam occurs only when $S_1'=S_2'=S_3'=0$. Two measurements are required for determining the null condition. Initially, the QWP 39 is removed from the output optical chain (equivalently in making $\phi=0°$), thus deleting the third term and retaining the first two terms in Eq. (26). For finite $S_1'$ and $S_2'$ the intensity fluctuates sinusoidally; however, to obtain a null condition both $\sigma$, $\psi$ for a given $\theta$ are optimized experimentally. For a selected $\theta_0$ the tilt ($\sigma_0$) and polarization ($\psi_0$) are varied in alternating sequential steps as the analyzer 41 is rotated until the intensity becomes constant thereby making $S_1'=S_2'=0$ in Eq. (26). The QWP 40 is then inserted into the optical chain for evaluating the third term. The analyzer 41 is again rotated which could result in a fluctuating intensity for a finite $S_3'$ in Eq. (26). However, a judicious selection in both the tilt and orientation angles ($\sigma$, $\theta$) (based upon the theoretical curves of FIG. 9) can be made to make $S_3'=0$, thus resulting in a depolarized beam of constant beam intensity $I=\frac{1}{2}I_0$ according to Eq. (26).

The method for evaluating the experimental results is shown in FIG. 10. The tilt angle $2\sigma'$ is measured from the front-surface reflected beam 44 at the translucent screen 45. The reflected beam 44 comprises actually of two beams 1) a front-surface reflected beam, and 2) a partially reflected beam from the internal front-surface of the corner cube 30 reflecting back into the corner cube 30 that in turn retro-reflects a beam into the direction of the front-surface reflected beam 44. Some cubes 30 could have a few degrees of angular separation between the two beamlets because the front surface of the cube 30 may not be ground and polished perpendicular to its major axis. The reflected beam 44 is viewed normal to the major diagonal of the cube 30; however, for small tilt angles $\sigma'$ the measurements can be simplified by maintaining the viewing screen perpendicular to the input beam path as the tilt angle of the corner cube 30 is varied.

Figure 2B:
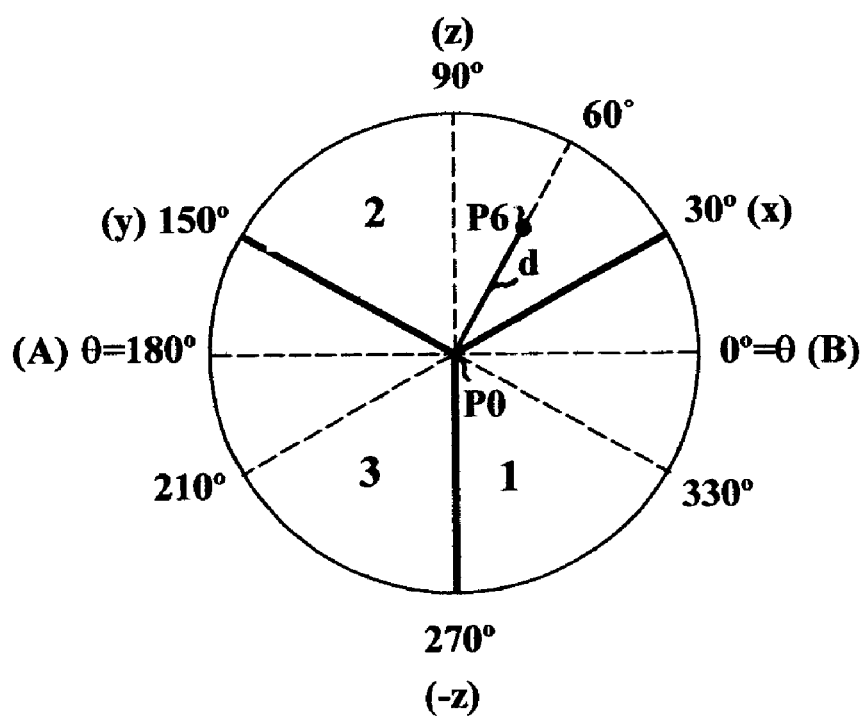
FIG. 2(b) shows the projected view of the plane.

The depolarization triple null-points were measured in the range of $\sigma'=8.25°$ to $9.25°$ where $\sigma'$ is the tilt angle external to the corner cube. This is to be compared to the theoretical value $\sigma'=\arcsin(n_0 \sin \sigma)=9.26°$ for $\sigma=6.12°$ and $n_0=1.5113$ (from the computation plot of FIG. 4). The experimental tilt-orientation angle $\theta$ also confirms the theoretical values of the angular directions $30°$-$210°$, $150°$-$330°$, $270°$-$90°$ for achieving complete depolarization which correspond to the edge-line directions of adjoining facets of the corner cube as shown in FIG. 2(b). Also, the experimental polarization angle $\psi$ tracks within a few degrees to the theoretical value. Double null-point measurements were also made, for example, at $\theta=60°$ and $120°$, the measured Stokes component and the tilt parameters are $S_3''=6.1\%$ and $\sigma'=10.85°$ (corresponding to an internal tilt angle $\sigma=7.15°$) which compare favorably to the theoretical values $S_3''=5.4\%$ and $\sigma=6.985°$. In general, there is excellent agreement between experiment and theory, thus confirming the theoretical curves of FIGS. (7)-(9).

Assuming the linearly polarized beam from the laser 31 to be completely polarized, the accurate measurement of small values (<10%) in $S_3''$ is a difficult task because of small ellipticity components introduced by the HWP polarization rotator 34 and the NPBS 36. It is desirable to introduce the linearly polarized beam directly from the laser 31 to the corner cube 30 with minimum polarization distortion. This can be performed for a vertically-oriented polarized laser 31 by removing the polarization rotator 34 and setting the polarization orientation angle to the $E_{S2}$ axis of FIG. 2(b) by rotating the corner cube 30 in lieu of the polarization rotator 34. Vertically-oriented polarization also minimizes the polarization distortion in the NPBS 36 provided that the output-port arm of the NPBS 36 is maintained perpendicular to the input-port arm, otherwise polarization perturbations could be introduced into the beam by the NPBS 36 beam director. Using these precautions, experimentally zero $S_3''$ values can be obtained that confirms the depolarization theory curves of FIG. 9. A note of caution: if the experimental system is not properly calibrated for "zero" depolarization, then the measured tilt angle will be incorrectly inferred as the "true" depolarization tilt angle.

Experimentally, depolarization can also be achieved by purposely introducing very small non-linearly polarized components in the otherwise linearly polarized input beam and/or in the retro-reflected output beam via the NPBS 36 in FIG. 10 which results in a near-zero value for $S_3''$ in the entire $\theta$-range for an optimized tilt angle $\sigma_0$. This is an important experimental observation because it provides another means for pre-setting the tilt angle in the corner cube for attaining the depolarization state. Also in combination, another means for depolarization control is by irradiating the corner cube slightly asymmetrical to the vertex of the cube. These artifacts could be incorporated into the adjustments of the $\sigma'$, $\theta$, $\psi$ parameters for establishing the depolarization conditions in generating a depolarized light beam.

Part III: Embodiments

Figure 11A:
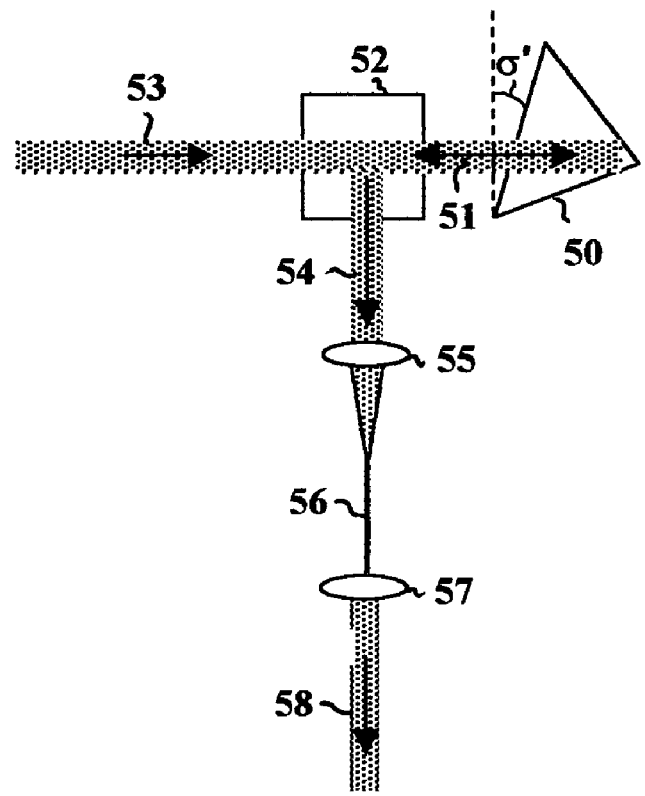

A first embodiment of a corner cube depolarizer is shown in FIG. 11(a). A linearly polarized collimated light beam 53 irradiates the tilted corner-cube 50 via the bi-directional beam director 52. The tilt angle $\sigma'$ rotates the corner cube 50 about the tilt-axis orientation angle (90°θ) (see FIG. 2(b)); in combination, the linear polarization orientation angle $\psi$ of the input beam 53 is rotated with respect to the corner cube orientation (see FIG. 2(a)). The inter-related parameters of σ', θ, ψ are pre-set to the predetermined experimental values that yield the depolarized state conditions. The retro-reflected beam 51 from the corner cube 50 is re-directed by the beam director 52 into the output beam 54. The retro-reflected output beam 54 is comprised of six elliptically polarized beamlets corresponding to the CCW and CW hexad regions of the corner cube 50 (see FIG. 3(b)); however, the output beam 54 focused by lens 55 into a short length single-mode fiber 56 located at a distance greater than the coherence length of the laser is spatially averaged to a depolarized state condition. The fiber 56 scrambles the image content of the hexad patterns. Since images cannot be transmitted through a fiber 56, spatial information of the hexad patterns is lost in the fiber 56 whereby spatial averaging combines and homogenizes the initial polarization states of the pattern into a completely depolarized beam in the fiber 56. The depolarized output beam from the fiber 56 is expanded and collimated by lens 57 into a free-space depolarized beam 58.

Figure 11B:
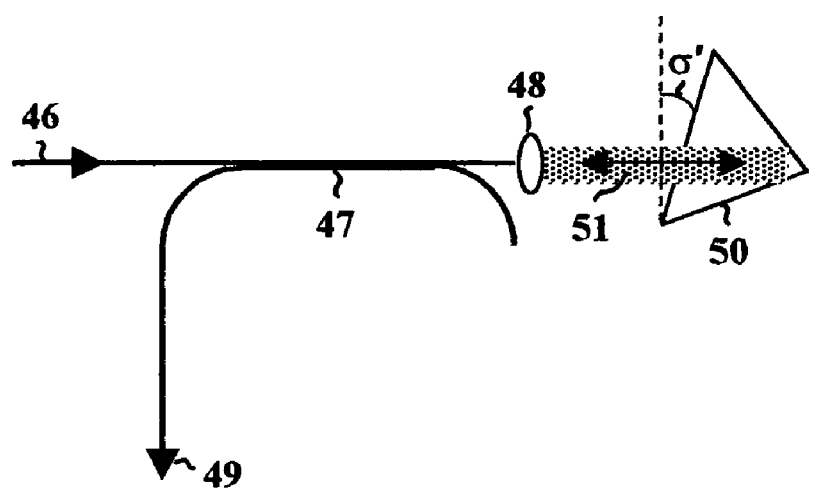
FIG. 11(b) shows the tilted corner cube in a fiber-coupled mode.

In a manner similar to FIG. 11(a) the embodiment of a fiber-optic coupled depolarizer is shown in FIG. 11(b), whereby the fiber coupler 47 functions as the input/output ports to the depolarizer. The linearly polarized input light beam 46 from the fiber (as collimated by lens 48) irradiates the tilted corner cube 50 which has been properly oriented to the polarization vector of the input beam. For optimum tilt conditions the light beam 51 retro-reflects from the corner cube 50, and transmits back through the lens 48 and into the fiber-optic coupler 47 emerging as the output depolarized light beam 49. The output fiber of the coupler 47 spatial averages the polarized retro-reflected beam 51 into a depolarized light beam 49.

Figure 12A:
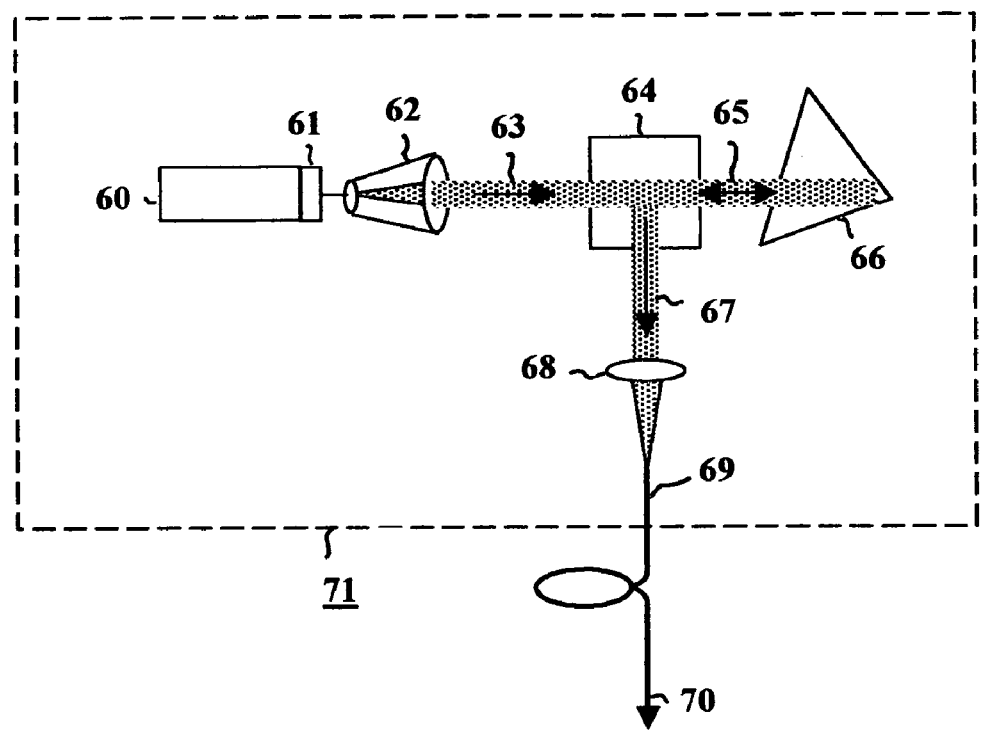
FIG. 12 shows the preferred embodiments for the corner-cube depolarizer where in FIG. 12(a) a laser source is integrated into the depolarizer module, and in FIG. 12(b) the laser source is in a remote module linked to the depolarizer module by a fiber optic cable.

The preferred embodiments for the depolarizers are shown in FIG. 12. FIG. 12(a) shows the components and a laser all integrated into the depolarizer module 71. The laser 60 via the isolator 61 provides a linearly polarized input beam to a beam-expander/collimator lens 62. The collimated light beam 63 transmits through the bi-directional beam director 64 and thence into the tilted corner cube 66. In order to obtain the depolarized state conditions the corner cube 66 is tilted and oriented to the predetermined angles (σ' and θ) as prescribed by FIG. 9. The corner cube 66 is rotated to the predetermined polarization orientation angle ψ with respect to the vertically polarized laser 60. The retro-reflected polarized beam 65 is re-directed to the output port of the beam director 64. A lens 68 launches the hexad-patterned polarized retro-reflected beam 67 into a single-mode fiber 69 located at a distance greater than the coherence length of the laser for spatial averaging purposes which combines and homogenizes the polarization states of the retro-reflected beam 67 into a depolarized beam in the fiber 69. The output light beam 70 from the fiber 69 is completely depolarized.

Figure 12B:
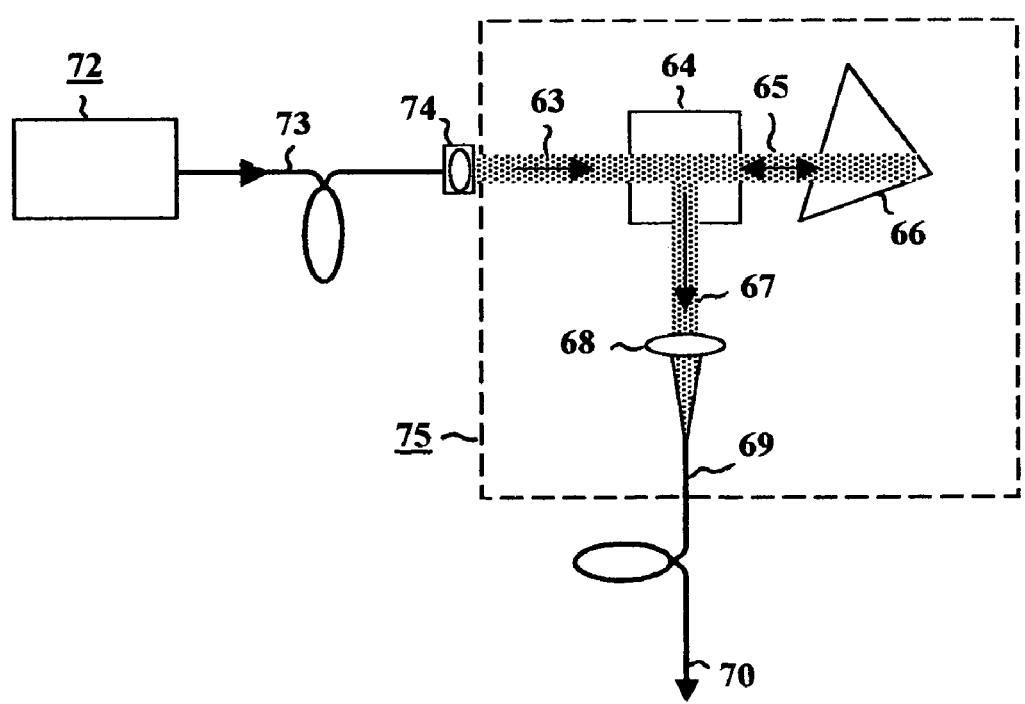

The linearly polarized laser can be maintained in a control-room environment instead of being deployed inside the depolarizer module. In FIG. 12(b) a remote linearly polarized laser module 72 is linked to a depolarizer module 75 by a polarization-maintaining fiber optic cable 73. A collimating lens 74 terminates the fiber optic cable 73 at the input port to the depolarizer module 75. The collimated light beam 63 from the lens 74 irradiates the optimally tilted corner cube 66 (at the pre-determined angles σ' and θ) via the beam director 64. At the input port of the depolarizer module 75 of FIG. 12(b) the polarization-maintaining fiber must be rotated to a pre-set polarization orientation angle ψ with respect to the orientation of the optimally tilted corner cube 66. The retro-reflected depolarized beam 65 is then re-directed to the output port of the beam director 64. Lens 68 launches the polarized retro-reflected beam 67 into the single-mode fiber 69 located at a distance greater than the coherence length of the laser for spatial averaging purposes which results in the completely depolarized output light beam 70.

The bi-directional beam director in FIGS. 10, 11(a)-(b), 12(a)-(b) can be, for example, a NPBS (non-polarizing beam splitter), a circulator, or a fiber coupler. The NPBS (a low-cost item) delivers only 25% of the laser beam intensity to the output beam port because of its 50% transmission factor; however, the output depolarized light beam intensity could be increased to 100% by using a circulator (high-cost item) instead of the NPBS. The polarization orientation vector of the input light beam and the corner cube must be properly oriented with respect to the axes of the beam director in order to obtain a completely depolarized output light beam.

In summary a method has been described for depolarizing light with a corner cube. A depolarizer unit for producing completely depolarized light is implemented by utilizing a commonly available BK7 glass corner cube that is tilted with respect to the input beam path. Other refractive index glass corner cubes could be used as well in the depolarizer, however with slightly different tilt conditions than the BK7 glass cube. The corner cube simplifies the means for producing completely depolarized light as compared to the complicated means for producing depolarized light with the previously cited methods and devices. The depolarizer is passive and operationally stable having a very low degree of polarization; furthermore, the depolarizer package can be very compact since corner cubes of a few mm size have already been fabricated commercially. In addition the corner cube has a cost advantage over the more expensive depolarizers that are currently available. When one considers for example that an optical amplifier (pumped by a depolarized light source) may be deployed every 100-km intervals in long-haul optical networks, the cost advantage of the corner cube as well (as its simplicity in operation and maintenance) can be appreciated for its practical application in communication systems. While my above description contains many specifications, these should not be construed as limitations on the scope of the invention, but rather as an exemplification of several preferred embodiments thereof.

I claim:

1. A method for generating a completely depolarized light beam, comprising:
   (a) a corner cube;
   (b) a collimated linearly polarized input light beam irradiating said corner cube having
      i. a tilt angle σ' rotated about a tilt-axis having an orientation angle
      (90°+θ) in said corner cube wherein the tilt angle σ' is between the laser beam path and the major diagonal of said corner cube, and in combination
      ii. the linear polarization orientation of said input light beam is rotated by the angle ψ with respect to said corner cube orientation
   wherein the inter-related parameters σ', θ, ψ have been predetermined to yield the depolarized state conditions;
   (c) a polarized retro-reflected light beam from said corner cube;
   (d) a bi-directional beam director interposed between the input light beam source and said corner cube re-directs said retro-reflected beam from said corner cube to the output port of said beam director thereby steering away said retro-reflected beam from said input light beam; and (e) a spatial averaging means for combining the polarization states of said retro-reflected beam from said corner cube via said output port of said beam director thereby generating said depolarized output beam having zero-valued Stokes polarization parameters $S_1''=S_2''=S_3''=0$.

2. The method of claim 1, wherein perturbations introduced in the polarization states of the beams and in the pointing direction of said input beam with respect to the vertex of said corner cube engenders said depolarized state conditions.

3. The method of claim 1, wherein:
(a) said corner cube is a total-internal-reflecting type having an arbitrary refractive index;
(b) a linearly polarized laser source provides said input light beam irradiating the tilted corner cube symmetrically about the vertex of said corner cube;
(c) the tilt orientation angle θ corresponds to the edge-line direction of two adjoining facets of said corner cube whereby said corner cube is tilted into said edge-line direction; and
(d) said spatial averaging means is a single-mode optical fiber wherein a lens launching said retro-reflected light beam into said fiber combines and homogenizes said polarization states of said retro-reflected beam thereby generating said depolarized output beam from said optical fiber.

4. The method of claim of 3, wherein said depolarized output beam from said optical fiber is expanded and collimated by a lens into a completely depolarized air beam.

5. A depolarizer comprising:
(a) a corner cube;
(b) a tilt means for tilting said corner cube with respect to an irradiating input light beam wherein said corner cube is tilted into the edge line direction of two adjoining facets in said corner cube, and in combination rotating the polarization orientation of said input light beam with respect to the orientation of said corner cube; and (c) an output light beam from said corner cube resulting in a depolarized state for a predetermined interrelated set of parameters of tilt angle σ' and orientation angle θ in said corner cube, and polarization orientation angle ψ in said input light beam.

6. The depolarizer of claim 5 wherein said tilt means is arranged to provide substantially a 9° tilt angle for the BK7 glass corner Cube.

7. The depolarizer of claim 5 further including:
(a) a laser to provide a collimated linearly polarized beam for said input light beam irradiating symmetrically to the vertex of said corner cube; and
(b) a polarization insensitive bidirectional beam director interposed between said laser and said corner cube whereby said output light beam is steered away from said input light beam.

8. The depolarizer of claim 7 wherein said tilt means is arranged to maintain said depolarized state wherein polarization distortions in said input light beam causing perturbations in said depolarized state are nullified by irradiating said corner cube slightly asymmetrical to said vertex of said corner cube.

9. The depolarizer of claim 5 wherein said tilt means is arranged to generate a spatially depolarized output beam from said corner cube comprising six spatially distinct beamlets of different polarization states wherein the sums from each row of the Stokes matrices of said beamlets have zero valued polarization parameters $S_1''=S_2''=S_3''=0$.

10. The depolarizer of claim 9 further including a lens to hunch said spatially depolarized output beam into a single mode optical fiber wherein said beamlets combine and merge into a single spatially averaged completely depolarized light beam at the output port of said optical fiber.

* * * * *